DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 30, 1970

875 O.G. 714

T875,029

MASKING OF ODORS OF PROCESSED PHOTOGRAPHIC ELEMENTS AND PROCESSING COMPOSITIONS

Raymond Snellman and Henry J. Fassbender, both % Kodak Park Division, Rochester, N.Y. 14650

Filed Jan. 2, 1970, Ser. No. 388
**Int. Cl. G03c *5/30***
U.S. Cl. 96—66
No Drawing. 13 Pages Specification

Certain odor masking compositions, such as carvone, ionone and pinene are incorporated into a photographic element to mask any processing odor. The use of such compounds in the top layer of a photographic element adapted for rapid processing followed by stabilization is suitable. The element can contain a silver halide developing agent. Other compounds useful for masking odor can also be employed in a processing composition, such as an activator solution or stabilizer solution.